United States Patent
Karlinsky et al.

(10) Patent No.: US 10,467,756 B2
(45) Date of Patent: Nov. 5, 2019

(54) SYSTEMS AND METHODS FOR DETERMINING A CAMERA POSE OF AN IMAGE

(71) Applicant: International Business Machines Corporation, Armonk, NY (US)

(72) Inventors: Leonid Karlinsky, Mazkert Batya (IL); Uzi Shvadron, Mitzpe Aviv (IL); Asaf Tzadok, Nesher (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/647,292

(22) Filed: Jul. 12, 2017

(65) Prior Publication Data

US 2018/0330504 A1 Nov. 15, 2018

Related U.S. Application Data

(63) Continuation-in-part of application No. 15/594,611, filed on May 14, 2017.

(51) Int. Cl.
*G06K 9/00* (2006.01)
*G06T 7/11* (2017.01)
(Continued)

(52) U.S. Cl.
CPC .............. *G06T 7/11* (2017.01); *G06F 16/532* (2019.01); *G06F 16/583* (2019.01);
(Continued)

(58) Field of Classification Search
CPC .... G06F 19/00; G06K 7/1456; G06K 9/4671; G06T 2207/10016; G06T 17/00; G06T 7/55
See application file for complete search history.

(56) References Cited

U.S. PATENT DOCUMENTS 9,158,988 B2 10/2015 Patel et al.
10,043,076 B1 * 8/2018 Zhang ................ G06K 9/00671
(Continued)

FOREIGN PATENT DOCUMENTS

WO 2012146253 11/2012
WO 2016043827 3/2016

OTHER PUBLICATIONS

Li et al., "Worldwide Pose Estimation using 3D Point Clouds", ECCV'12 Proceedings of the 12th European conference on Computer Vision, Oct. 7-13, 2012, pp. 15-29, vol. Part I.
(Continued)

*Primary Examiner* — Feng Niu
*Assistant Examiner* — Guillermo M Rivera-Martinez
(74) *Attorney, Agent, or Firm* — G. E Ehrlich

(57) ABSTRACT

There is provided a method of computing a camera pose of a digital image, comprising: computing query-regions of a digital image, each query-region maps to training image region(s) of training image(s) by a 2D translation and/or a 2D scaling, each training image associated with a reference camera pose, each query-region associated with a center point and a computed weighted mask that weights the query-region pixels according to computed correlations with the corresponding training image region, mapping cloud points corresponding to pixels of matched training image region(s) to corresponding images pixels of the matched query-regions according to a statistically significant correlation requirement between the center point of the query-region and the matched training image region, and according to the computed weight mask, and computing the camera pose according to an aggregation of the camera poses, and the mapped cloud points and corresponding image pixels of the matched query-regions.

19 Claims, 5 Drawing Sheets

(51) Int. Cl.
*G06T 7/73* (2017.01)
*G06N 20/00* (2019.01)
*G06F 16/532* (2019.01)
*G06F 16/583* (2019.01)
*G06K 9/62* (2006.01)

(52) U.S. Cl.
CPC ..... *G06F 16/5838* (2019.01); *G06K 9/00664* (2013.01); *G06K 9/6203* (2013.01); *G06N 20/00* (2019.01); *G06T 7/73* (2017.01); *G06T 7/74* (2017.01); *G06T 2207/10004* (2013.01); *G06T 2207/10028* (2013.01); *G06T 2207/20021* (2013.01); *G06T 2207/20081* (2013.01); *G06T 2207/30244* (2013.01)

(56) References Cited

U.S. PATENT DOCUMENTS

| | | | | |
|---|---|---|---|---|
| 2006/0188131 A1* | 8/2006 | Zhang | ....................... | G06T 7/74 382/103 |
| 2010/0098327 A1* | 4/2010 | Se | ........................ | G01C 11/06 382/154 |
| 2010/0158355 A1* | 6/2010 | Najafi | ................... | G06K 9/3208 382/154 |
| 2012/0070070 A1* | 3/2012 | Litvak | ................ | G06K 9/00201 382/154 |
| 2013/0011069 A1* | 1/2013 | Quan | ................ | G06F 17/30247 382/190 |
| 2013/0155058 A1* | 6/2013 | Golparvar-Fard | .... | G06T 19/006 345/419 |
| 2013/0236089 A1* | 9/2013 | Litvak | ................ | G06K 9/00382 382/154 |
| 2013/0335575 A1* | 12/2013 | Tsin | ........................ | G06T 7/75 348/169 |
| 2014/0270482 A1* | 9/2014 | Chakraborty | ...... | G06K 9/00221 382/154 |
| 2015/0022640 A1* | 1/2015 | Metzler | ................ | H04N 13/211 348/46 |
| 2015/0023602 A1* | 1/2015 | Wnuk | ............... | G06F 17/30247 382/190 |
| 2015/0036918 A1* | 2/2015 | Pham | .................. | G06K 9/00214 382/154 |
| 2015/0161476 A1* | 6/2015 | Kurz | .................... | G06K 9/4671 382/190 |
| 2015/0243080 A1* | 8/2015 | Steinbach | ......... | G06F 17/30244 345/633 |
| 2015/0248584 A1* | 9/2015 | Greveson | ........... | G06K 9/00476 382/113 |
| 2016/0098095 A1* | 4/2016 | Gonzalez-Banos | ..... | G06F 3/017 345/156 |
| 2016/0171703 A1 | 6/2016 | Rhee et al. | | |
| 2017/0039765 A1* | 2/2017 | Zhou | ..................... | G06T 19/006 |
| 2018/0012105 A1* | 1/2018 | Fan | .................... | G06K 9/00664 |
| 2018/0143756 A1* | 5/2018 | Mildrew | ................. | G06F 3/011 |
| 2018/0144458 A1* | 5/2018 | Xu | .......................... | G06T 7/004 |
| 2018/0232906 A1* | 8/2018 | Kim | .......................... | G06T 7/75 |
| 2018/0268237 A1* | 9/2018 | Stanimirovic | ....... | G06K 9/2018 |

OTHER PUBLICATIONS

Rolin et al., "Viewpoint simulation for camera pose estimation from an unstructured scene model", 2015 IEEE International Conference on Robotics and Automation (ICRA), May 26-30, 2015.

A presentation at the Research Workshop of the Israel Science Foundation (ISF) The 6th Annual Henry Taub International TCE Conference, 3D Visual Computing: Graphics, Geometry & Imaging, May 24-25, 2016, ⊐Kogan Auditorium, Meyer Building (EE) Technion, Haifa.—https://tce.technion.ac.il/tce-conferences/tce-conference-2016-program/.

* cited by examiner

SYSTEMS AND METHODS FOR DETERMINING A CAMERA POSE OF AN IMAGE

RELATED APPLICATION

This application is a Continuation-in-Part (CIP) of U.S. patent application Ser. No. 15/594,611 filed May 14, 2017, the contents of which are incorporated herein by reference in their entirety.

BACKGROUND

The present invention, in some embodiments thereof, relates to image processing and, more specifically, but not exclusively, to systems and methods for computing a camera pose of an image.

Exemplary methods for computing a camera pose of an image include Structure From Motion (SFM), and Simultaneous Localization And Mapping (SLAM), which index local features directly and search for them within the index when a query image is received and local features are sampled from the query image.

SUMMARY

According to a first aspect, a computed implemented method of computing a camera pose of a digital image comprises: receiving a digital image, computing a plurality of query-regions of the digital image, each query-region of the digital image maps to at least one training image region of at least one training image of a plurality of training images by at least one of a two dimensional (2D) translation and a 2D scaling operation, each training image associated with one of a plurality of reference camera poses, each query-region associated with a center point and a computed weighted mask that weights the query-region pixels according to computed correlations with the corresponding training image region, mapping cloud points corresponding to pixels of each matched training image region to corresponding images pixels of the computed plurality of matched query-regions of the digital image according to a statistically significant correlation requirement between the common center point of the respective matched query-region and the center point of the respective matched training image region, and according to the computed weight mask, and computing the camera pose of the digital image according to an aggregation of the camera poses associated with the plurality of training images matched to query-regions, and the mapped cloud points and corresponding image pixels of the computed plurality of matched query-regions.

According to a second aspect, a system for computing a camera pose of a digital image comprises: a non-transitory memory having stored thereon a code for execution by at least one hardware processor of a computing device, the code comprising: code for receiving a digital image, code for computing a plurality of query-regions of the digital image, each query-region of the digital image maps to at least one training image region of at least one training image of a plurality of training images by at least one of a two dimensional (2D) translation and a 2D scaling operation, each training image associated with one of a plurality of reference camera poses, each query-region associated with a center point and a computed weighted mask that weights the query-region pixels according to computed correlations with the corresponding training image region, code for mapping cloud points corresponding to pixels of each matched at least one training image region to corresponding images pixels of the computed plurality of matched query-regions of the digital image according to a statistically significant correlation requirement between the common center point of the respective matched query-region and the center point of the respective matched training image region, and according to the computed weight mask, and code for computing the camera pose of the digital image according to an aggregation of the camera poses associated with the plurality of training images matched to query-regions, and the mapped cloud points and corresponding image pixels of the computed plurality of matched query-regions.

According to a third aspect, a computer program product for computing a camera pose of a digital image comprises: a non-transitory memory having stored thereon a code for execution by at least one hardware processor of a computing device, the code comprising: instructions for receiving a digital image, instructions for computing a plurality of query-regions of the digital image, each query-region of the digital image maps to at least one training image region of at least one training image of a plurality of training images by at least one of a two dimensional (2D) translation and a 2D scaling operation, each training image associated with one of a plurality of reference camera poses, each query-region associated with a center point and a computed weighted mask that weights the query-region pixels according to computed correlations with the corresponding training image region, instructions for mapping cloud points corresponding to pixels of each matched at least one training image region to corresponding images pixels of the computed plurality of matched query-regions of the digital image according to a statistically significant correlation requirement between the common center point of the respective matched query-region and the center point of the respective matched training image region, and instructions for computing the camera pose of the digital image according to an aggregation of the camera poses associated with the plurality of training images matched to query-regions, and the mapped cloud points and corresponding image pixels of the computed plurality of matched query-regions.

The systems and/or methods and/or code instructions stored in a storage device executed by one or more processors described herein provide a technical solution to the technical problem of determining the camera pose of a query image, optionally a single query image (for example, as opposed to a sequence of query images, for example, a video). The technical solution described herein computes the 3D relative pose of the camera for an arbitrary object and/or scene view captured in the query image.

The systems and/or methods and/or code instructions stored in a storage device executed by one or more processors described herein are may be used to solve a particular problem in the application domain of image processing, for example, Augmented Reality (AR) applications in which the 3D pose of the captured scene relatively to a camera is used. For example, in high-performance aiding devices with AR interface for a field technician, extended show-room scenarios (e.g., where the exhibit is augmented with additional information and interface using AR), and end user self-service applications allowing for home self-support of complicated appliances.

The systems and/or methods and/or code instructions stored in a storage device executed by one or more processors described herein improve performance of a computing unit for determining the camera pose of a query image, optionally a single query image. The performance of the computing unit is improved, for example, by generating a relatively more robust and/or more reliable solution in comparison to other methods that generate a significant amount of false matches and perform pruning to identify a solution. The accuracy of the computed camera pose computed according to the systems, methods, and/or code instructions described herein is relatively higher, more robust, and/or provides improved discriminative performance, in comparison to other approaches for estimation of 3D camera poses. Other approaches that are based on direct local feature (e.g., patch and descriptor) matches for detecting an object and recovering the 3D pose relative to the camera are prone to inaccuracies that arise by performing local matches, which generate a significant amount of false matches. Existing 3D camera pose estimation approaches are based on matching local features (e.g., small local image patches and a descriptor represented as a vector denoting the visual content of the patch) between the query image and a cloud point having points that are associated with the features collected from training images.

The improved performance of the computing unit implementing the systems, methods, and/or code instructions described herein is obtained, for example, due to processing of relatively larger region matches (e.g., in comparison to other approaches that match local features) between the query image and a set of training images each depicting a portion of the scene of the query image and associated with a known object pose. The regions are matched, optionally in parallel, according to a matching requirement (e.g., arbitrary scale and/or shift transforms). Data is aggregated from the matched regions to compute the camera pose.

The improved performance of the computing unit implementing the systems, methods, and/or code instructions described herein is obtained, for example, by processing a single query image to compute the camera pose, in comparison, for example to other approaches (e.g., SLAM) in which video input is analyzed. Other approaches are unable to accurately analyze a single image, as direct matching of local features between the query image and the point cloud is prone to generate a large amount of false matches that reduce the robustness and/or accuracy of the computed solution. The false matches are generated due to the common lack of discrimination in the local information of the small patch features.

The systems and/or methods and/or code instructions stored in a storage device executed by one or more processors described herein improve an underlying technical process within the technical field of image processing, in particular, within the field of automatic identification of the camera pose associated with the scene depicted in an image. The systems and/or methods and/or code instructions described herein improve the accuracy of a computed camera prose for a digital image, in particular for a single digital image.

In a further implementation form of the first, second, and third aspects, each query-region of the digital image and mapped at least one training image region are of arbitrary size, arbitrary shape, arbitrary location and arbitrary scale, and are automatically determined.

In a further implementation form of the first, second, and third aspects, the weighted mask is computed by a correlation indicative of similarity between query descriptors extracted from the query-region and training descriptors extracted from the corresponding training image region, with respect to at least one of the 2D translation and 2D scaling operation.

In a further implementation form of the first, second, and third aspects, the weighted mask defines the shape, location, and scale of the respective detected query-region.

In a further implementation form of the first, second, and third aspects, at least some of the training image regions overlap.

In a further implementation form of the first, second, and third aspects, the weight mask is contiguous or a group of connected components that include the query-region.

In a further implementation form of the first, second, and third aspects, the method further comprises and/or the processor is further configured to and/or the computer program product includes additional instructions for extracting a plurality of query descriptors from a respective plurality of locations in the digital image, comparing each one of the plurality of query descriptors with a plurality of training descriptors for identifying a plurality of matching training descriptors, each one of the plurality of training descriptors is associated with one of a plurality of reference camera poses, and with relative location data from a center point of the training image region of the training image of the plurality of training images, and computing the plurality of query-regions of the digital image by clustering the query descriptors having common center points defined by the matching training descriptors.

In a further implementation form of the first, second, and third aspects, the method further comprises and/or the processor is further configured to and/or the computer program product includes additional instructions for computing weights of the mapped cloud points and corresponding image pixels of the computed plurality of query-regions of the digital image, wherein the weights denote the probability that the nearest neighbors of each respective sampled query descriptor contributes to the associated training image region, wherein the camera pose is computed according to the computed weights.

In a further implementation form of the first, second, and third aspects, the method further comprises and/or the processor is further configured to and/or the computer program product includes additional instructions for computing a back projection data structure for each the plurality of query-regions of the digital image, wherein the dimensions of the back projection data structure correspond to the dimensions of the query image, wherein the back projection data structure stores the computed weights according to the plurality of locations of the digital image from which the plurality of query descriptors are extracted, wherein for each of the mapped cloud points and corresponding image pixels of the computed plurality of query-regions, the respective pixel of the digital image is weighted by the value of the back-projection data structure defined for the respective pixel.

In a further implementation form of the first, second, and third aspects, the camera pose of the digital image is computed according to an iteratively reweighted least squares (IRLS) based approach.

In a further implementation form of the first, second, and third aspects, the camera pose of the digital image is computed according to a three dimensional (3D) point cloud model (PCM) of at least a portion of a scene captured within the digital image.

In a further implementation form of the first, second, and third aspects, the PCM is computed from a sequence of 2D images according to a structure-from-motion (SFM) based method.

In a further implementation form of the first, second, and third aspects, the determined camera pose is a new camera pose that does not necessarily match to the camera poses of the training images.

In a further implementation form of the first, second, and third aspects, the plurality of query-regions of the digital image and the mapped at least one training image region are of arbitrary location, arbitrary scale, and arbitrary shape.

In a further implementation form of the first, second, and third aspects, the plurality of training descriptors are extracted from a training set comprising a single training sample image associated with a unique camera pose of at least a portion of a scene captured in the digital image.

In a further implementation form of the first, second, and third aspects, each query-region is further associated with a scale relative to a reference size, and wherein each query-region of the plurality of query-regions is computed by: aggregating the relative location data of the matching training descriptors to generate a Kernel Density Estimate (KDE) for a plurality of posterior probability maps of the center point and scale of each respective training image region of a training image, aggregating the posterior probability maps into a plurality of probability map clusters, extracting each of the plurality of query-regions with inter-scale normalization and non-maximal suppression according to location of the center point and the scale of each respective cluster of the plurality of probability map clusters, wherein each of the plurality of query-regions is defined according to the center point and scale of the training image associated with the respective cluster of the plurality of probability map clusters and according to a subset of query image descriptors that contribute weights to the respective probability map cluster, the subset of descriptors is converted to a probability map by accumulating respective weight contributions to the probability map cluster to the locations from which the subset of query image descriptors were sampled.

In a further implementation form of the first, second, and third aspects, the plurality of training descriptors are indexed with a sub-linear search data structure, and the comparing is performed by searching for the matching training descriptor of the extracted query descriptor within the sub-linear search data structure.

In a further implementation form of the first, second, and third aspects, the comparing is performed by finding a set of Euclidean nearest neighbors of the respective extracted query descriptor, wherein each member of the set of Euclidean nearest neighbors is a certain matching training descriptor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION

Figure 1:
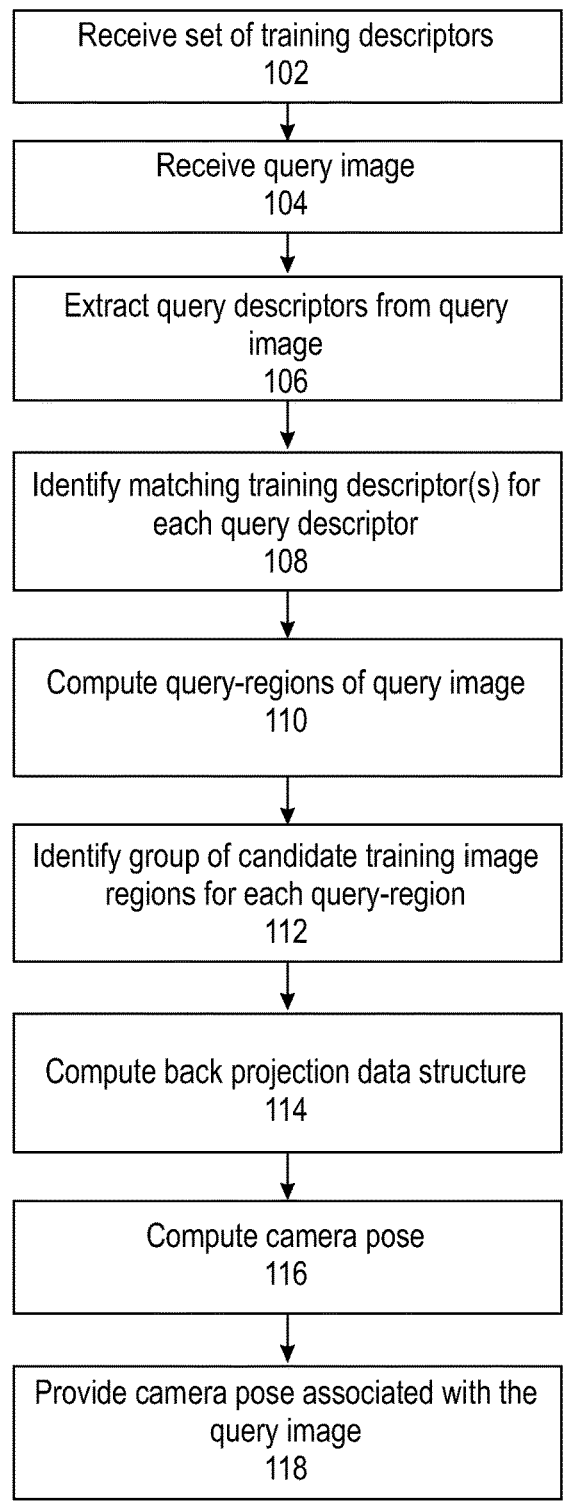
FIG. 1 is a flowchart of a method of computing a camera pose of an image based on matching regions of the digital image, in accordance with some embodiments of the present invention.

The present invention, in some embodiments thereof, relates to image processing and, more specifically, but not exclusively, to systems and methods for computing a camera pose of an image.

An aspect of some embodiments of the present invention relates to systems, methods, and/or code instructions (stored in a storage device executable by one or more processors) for computing a camera pose of a scene depicted in a digital image (also referred herein as a query image). The camera pose for the query image is computed by aggregating camera poses associated with training images having regions that are matched to query-regions of the query image, and according to an aggregation of cloud points mapped to corresponding pixels of the matched query-regions. Each training image includes a portion of the scene captured in the query image, and is associated with a defined camera pose (e.g., location and/or 3D pose according to a point cloud). The training image regions may be matched in parallel to the query-image regions according to a matching requirement, optionally an arbitrary scale and/or shift transformation, optionally a 2D scale and/or 2D shift transformation between the query-region and the matched training image region.

Each query-region is associated with a center point and a computed weighted mask that weights the query-region pixels according to computed correlations with the corresponding training image regions. The weighted mask may be computed based on a computed correlation indicative of similarity of the query descriptors extracted from the query image region and the training descriptors extracted from the corresponding training image region. The weighted mask is computed with respect to the computed 2D scale and/or 2D shift transformation between the query-region and the matched training image region. The computed weighted mask may be contiguous or a group of connected components that includes the query-region.

Each matched query-region represents a portion of the (i.e., not the entire) digital image. Each matched query-region includes a number of pixels sufficient for extraction of multiple query descriptors (which are matched to training descriptors of the training images, as described herein). Each query-region of the digital image and mapped training image region(s) are one or more of: arbitrary size, arbitrary shape, arbitrary location, and arbitrary scale. Size, shape, location, and/or scale is automatically computed (e.g., by code instruction executed by one or more processors). The weighted mask defines the shape, location, and/or scale of the respective detected query-region. It is noted that the arbitrary size, arbitrary shape, arbitrary location, and arbitrary scale is in contract to a prescribed size, shape, location and/or scale based on fixed parameters, for example, which form a basis for other methods. The relationship between the query image and the training images may be one to one.

Cloud points corresponding to pixels of each matched training image region are mapped to corresponding images pixels of the matched query-region of the digital image according to a statistically significant correlation requirement between the common center point of the query-region and the center point of the reference training image region.

Optionally, an estimate (e.g., Bayesian estimate) of the correlation (e.g., amount of agreement) is computed for respective pixels (optionally for each pixel) of the matched query-region of the query image and the corresponding matched pixel of the region of the training image. Optionally, a spatial back projection data structure (e.g., matrix) is computed. The back projection data structure represents a map that weights pixels (e.g., every pixel) of the query image in accordance to the estimated amount of agreement (e.g., correlation) with each matched training image region. The maps represented by the back projection data structure serve as an estimate (e.g., Bayesian estimate) for the large matched query-regions and training image regions.

The matched query-regions are mapped to respective training image regions according to a translation and/or scale, optionally a 2D translation and/or 2D scale operation. The probability associated with the pixels (e.g., each pixel) in each matched query-region, stored by the back projection data structure, weighs the cloud point correspondences that are associated with the matched training image regions and fall inside the matched query-regions of the query image. The camera pose is computed based on an aggregation of the camera poses according to the weighted correspondence.

The matched query-regions may be of arbitrary size and/or arbitrary shape. The matched query-regions may be non-contiguous.

The camera pose may be a new pose that is not depicted in any of the training images.

Optionally, the training descriptors are extracted from a training set that include a set of single training sample images each denoting a distinct view of a portion of the scene depicted in the query image. Two or more of the training images may overlap.

The systems and/or methods and/or code instructions stored in a storage device executed by one or more processors described herein provide a technical solution to the technical problem of determining the camera pose of a query image, optionally a single query image (for example, as opposed to a sequence of query images, for example, a video). The technical solution described herein computes the 3D relative pose of the camera for an arbitrary object and/or scene view captured in the query image.

The systems and/or methods and/or code instructions stored in a storage device executed by one or more processors described herein are may be used to solve a particular problem in the application domain of image processing, for example, Augmented Reality (AR) applications in which the 3D pose of the captured scene relatively to a camera is used. For example, in high-performance aiding devices with AR interface for a field technician, extended show-room scenarios (e.g., where the exhibit is augmented with additional information and interface using AR), and end user self-service applications allowing for home self-support of complicated appliances.

The systems and/or methods and/or code instructions stored in a storage device executed by one or more processors described herein improve performance of a computing unit for determining the camera pose of a query image, optionally a single query image. The performance of the computing unit is improved, for example, by generating a relatively more robust and/or more reliable solution in comparison to other methods that generate a significant amount of false matches and perform pruning to identify a solution. The accuracy of the computed camera pose computed according to the systems, methods, and/or code instructions described herein is relatively higher, more robust, and/or provides improved discriminative performance, in comparison to other approaches for estimation of 3D camera poses. Other approaches that are based on direct local feature (e.g., patch and descriptor) matches for detecting an object and recovering the 3D pose relative to the camera are prone to inaccuracies that arise by performing local matches, which generate a significant amount of false matches. Existing 3D camera pose estimation approaches are based on matching local features (e.g., small local image patches and a descriptor represented as a vector denoting the visual content of the patch) between the query image and a cloud point having points that are associated with the features collected from training images.

The improved performance of the computing unit implementing the systems, methods, and/or code instructions described herein is obtained, for example, due to processing of relatively larger region matches (e.g., in comparison to other approaches that match local features) between the query image and a set of training images each depicting a portion of the scene of the query image and associated with a known object pose. The regions are matched, optionally in parallel, according to a matching requirement (e.g., arbitrary scale and/or shift transforms). Data is aggregated from the matched regions to compute the camera pose.

The improved performance of the computing unit implementing the systems, methods, and/or code instructions described herein is obtained, for example, by processing a single query image to compute the camera pose, in comparison, for example to other approaches (e.g., SLAM) in which video input is analyzed. Other approaches are unable to accurately analyze a single image, as direct matching of local features between the query image and the point cloud is prone to generate a large amount of false matches that reduce the robustness and/or accuracy of the computed solution. The false matches are generated due to the common lack of discrimination in the local information of the small patch features.

The systems and/or methods and/or code instructions stored in a storage device executed by one or more processors described herein improve an underlying technical process within the technical field of image processing, in particular, within the field of automatic identification of the camera pose associated with the scene depicted in an image. The systems and/or methods and/or code instructions described herein improve the accuracy of a computed camera prose for a digital image, in particular for a single digital image.

The systems and/or methods and/or code instructions stored in a storage device executed by one or more processors described herein are tied to physical real-life components, including a camera that captures the image that is analyzed to identify the camera pose associated with the image.

Accordingly, the systems and/or methods described herein are inextricably tied to computing technology and/or physical components (i.e., camera) to overcome an actual technical problem arising in processing of digital images.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
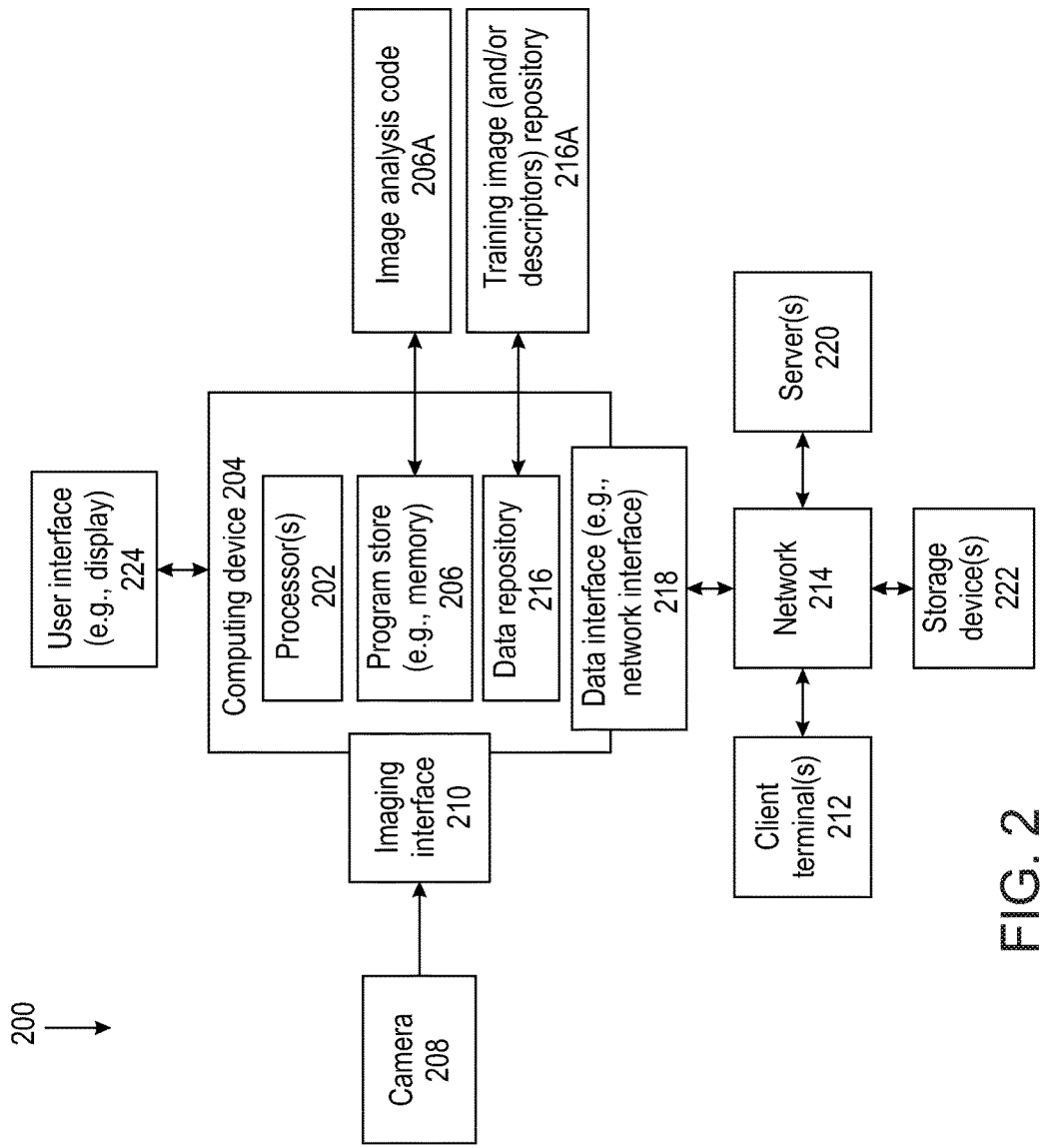
FIG. 2 is a is a block diagram of components of a system for computing a camera pose of an image based on matching regions of the digital image, in accordance with some embodiments of the present invention.

Reference is now made to FIG. 1, which is a flowchart of a method of determining a pose of a camera associated with a scene captured in a digital image, optionally in a single digital image, based on matching regions of the digital image, in accordance with some embodiments of the present invention. Reference is also made to FIG. 2, which is a block diagram of components of a system 200 for computing a pose of a camera associated with a scene captured in a digital image, optionally a single digital image, based on matching regions of the digital image, in accordance with some embodiments of the present invention. System 200 may implement the acts of the method described with reference to FIG. 1, by processor(s) 202 of a computing device 204 executing code instructions stored in a program store 206.

Computing device 204 receives an image for processing captured by a camera 208 for identification of the pose of camera 208 associated with the image. The image may be provided by camera 208 and/or stored on a storage device. Camera 208 may be implemented as, for example, a digital camera, a video camera, and an imaging sensor. Camera 208 may capture two dimensional digital images (2D), in color (e.g., red, green, blue based) and/or in black and white (i.e., grayscale). Camera 208 may capture a 3D image, which may be processed to create 2D images (e.g., slices) for processing. Camera 208 may capture a single image for processing, and/or multiple images. Camera 208 may be distinct from the camera(s) that captured the training images, and/or may be the same camera that captured the training images (in which case camera 208 captures the digital image at a different time that the time when the training image(s) are captured).

Computing device 204 receives the image(s) captured by camera 208 via one or more image interface(s) 210, for example, a wire connection, a wireless connection, other physical interface implementations, and/or virtual interfaces (e.g., software interface, application programming interface (API), software development kit (SDK)).

Computing device 204 may be implemented as, for example, a client terminal, a server, a computing cloud, a mobile device, a desktop computer, a thin client, a Smartphone, a Tablet computer, a laptop computer, a wearable computer, glasses computer, and a watch computer. Computing device 204 may include locally stored software that performs one or more of the acts described with reference to FIG. 1, and/or may act as one or more servers (e.g., network server, web server, a computing cloud) that provides services (e.g., one or more of the acts described with reference to FIG. 1) to one or more client terminals 212 over a network 214, for example, providing software as a service (SaaS) to the client terminal(s) 212, providing an application for local download to the client terminal(s) 212, and/or providing functions via a remote access session to the client terminals 212, such as through a web browser.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include one or more processors (homogenous or heterogeneous), which may be arranged for parallel processing, as clusters and/or as one or more multi core processing units.

Storage device (also known herein as a program store, e.g., a memory) 206 stores code instructions implementable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores image analysis code instructions 206A that executes one or more acts of the method described with reference to FIG. 1.

Computing device 204 may include a data repository 216 for storing data, for example, a training image and/or descriptor repository 216A that stores training images and/or training descriptors extracted for each training image for matching to query descriptors extracted from the query image, as described herein. Data repository 216 may be implemented as, for example, a memory, a local hard-drive, a removable storage unit, an optical disk, a storage device, and/or as a remote server and/or computing cloud (e.g., accessed via a network connection). It is noted that training descriptors of repository 216A may be stored in data storage device 206, for example, executing portions are loaded from data repository 216 into data storage device 206 for execution by processor(s) 202.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing unit 204 may access one or more remote servers 220 and/or storage devices 222 via network 214, for example, to download additional training images, and/or to provide the identification of the camera pose in the received image.

Computing device 204 may connect via network 214 (or another communication channel, such as through a direct link (e.g., cable, wireless) and/or indirect link (e.g., via an intermediary computing unit such as a server, and/or via a storage device) with one or more of:

Client terminal(s) 212, for example, when computing device 204 acts as a server providing SaaS. The client terminals 212 may each provide one or more images to computing device 204 for analysis over network 214. It is noted that camera 208 (and/or a storage device storing the captured image) may be connected to client terminal 212, providing the image via network 214.

Remotely located server 220 that receives the identified camera pose of the image. Server 220 may locally display the identified camera pose, store the camera pose, and/or transmit the camera pose to another server.

Storage device 222 that stores one or more of: images captured by camera(s) 208, training image(s), and/or the identified camera pose. Storage device 222 may include, for example, a storage server, a computing cloud storage server, or other implementations.

Computing device 204 includes or is in communication with a user interface 224 that includes a mechanism for a user to enter data (e.g., designate the image) and/or view presented data (e.g., view the camera pose of the image). Exemplary user interfaces 224 include, for example, one or more of, a touchscreen, a display, a keyboard, a mouse, and voice activated software using speakers and microphone.

Referring now back to FIG. 1, at 102, a set of training descriptors is received. The set of training descriptors are stored, for example, in training descriptors repository 216A.

The set of training descriptors is optionally created by computing device 204 from a received training set of images. The set of training images is mathematically represented herein as $\{I_t\}$. The training set includes a sample of one or more images each representing a camera pose of a reference scene and/or one or more reference objects (which is/are expected to appear in the query image). The number of images per camera pose may be small, for example, a single image, two images, three image, four images, or five images. The scene depicted by the training images may represent a sub-portion of the scene expected in the query image. The number of training images per camera pose may be smaller than required by traditional learning methods to achieve a statistically significant camera pose estimation that is similar to the probability of the camera pose estimation achieved by the systems and/or methods described herein. For example, the systems and/or methods described herein, using a single image per camera pose, which may include a partial scene of the scene expected in the query image may achieve a similar probability of accuracy of the camera pose as other learning methods trained using at least 100 images per camera pose.

The camera poses associated with the training images are computed according to a 3D Point Cloud Model coordinate system. The 3D PCM may be computed by computing device 204, and/or by another computing device, for example, based on the Structure From Motion (SFM) approach, for example, Visual SFM as described with reference to C. Wu. *Towards linear-time incremental structure from motion. In 3D Vision*—3DV 2013, 2013 International Conference on, pages 127-134, June 2013, and C. Wu, S. Agarwal, B. Curless, and S. M. Seitz. *Multicore bundle adjustment. In Computer Vision and Pattern Recognition* (*CVPR*), 2011 IEEE Conference on, pages 3057-3064, June 2011.

Each training image is associated with the pose of the camera that captured the respective training image, for example, stored as a tag, as metadata, and/or in a database that maps training images and camera poses. The pose of the camera is according to the 3D PCM. The pose of the camera may be stored as a rotation matrix (denoted as R), a translation vector (denoted as T), and a calibration matrix (denoted as K), with respect to the PCM coordinate system. It is noted that the camera pose computed for the query image is denoted by R and T for a known K.

Each training image is associated with a set of correspondences between one or more pixels of the respective training image and 3D point(s) of the PCM.

The training set includes training descriptors extracted from each of the images. In terms of mathematical representation, $\{F^i_t\}$ denotes the set of all training descriptors collected extracted from $\{I_t\}$.

The training set may be stored, for example, locally by computing device 204 (e.g., in repository 216A, within data repository 216), and/or externally in a storage device and/or storage server.

The training set may be created by computing device 204 by extracting the training descriptors from the set of training images, and/or created by another computing device.

The training descriptors are extracted from each training image according to a sampling pattern. The sampling pattern may be uniform, for example, based on adjacent boxes having a uniform size, for example, a base step based on a predefined number of pixels, for example, 4 pixels, 10 pixels, or other values. The sampling pattern may be based on a predefined pattern, for example, a grid of 24×24 patches, a grid of 50×50 patches, or other values. The sampling pattern may be random.

Optionally, the training descriptors are extracted from each sample image in a sampling pattern that is denser than the sampling pattern used to extract query descriptors from the received image (as described herein). For example, the ratio between the sampling pattern of extraction of query descriptors relative to the sampling pattern of extraction of training descriptors is 1:1.2, 1:1.5, 1:2, 1:5, 1:10, or other values.

Exemplary images descriptors are based on the scale invariant feature transform (SIFT) method, for example, grayscale SIFT (e.g., as described with reference to D. G. Lowe. *Distinctive image features from scale-invariant keypoints. Int. J. Comput. Vision*, 60(2):91-110, November 2004. B. Fulkerson, A. Vedaldi, and S. Soatto. *Localizing objects with smart dictionaries. In Proceedings of the 10th European Conference on Computer Vision: Part I, ECCV* '08, pages 179-192, Berlin, Heidelberg, 2008. Springer-Verlag), dense grayscale SIFT, and color SIFT. Other exemplary training descriptors may be based on, for example, color, shape, and texture.

Use of grayscale images (training images and/or image being analyzed) may improve computational performance and/or accuracy of computing the camera pose of the query image in comparison to use of color images, for example, due to reliance to color variation arising, for example, from lighting and/or camera changes.

Optionally, multiple scales of each training image of the set $\{I_t\}$ are computed, for example, based on a pyramid structure, for example, a Gaussian pyramid. Training descriptors are extracted for each level of the pyramid. The extracted training descriptors are stored in association (e.g., tagged, annotated) with the level of the pyramid of the image from which the training descriptors were extracted. Exemplary pyramid level scales are in the range (0.5, 1], for example, $\{0.6, 0.8, 1\}$. The support for the rest of the scales is achieved at query time by down-scaling the query image by a factor of 0.5 in a loop until minimal vertical size is reached, which provides a running time that is ≤1.5×the running time of $I_q$ processed in its original scale alone.

Each extracted training descriptor, mathematically represented herein as $F^i_t$, is stored with the following data (e.g., metadata):

Camera pose (also referred to herein as identifier) of the camera that captured the training image with reference to the 3D PCM, mathematically represented as $l(F^i_t)=l(I_t)$.

Relative location of the extracted training descriptor $F^i_t$ within the training image, optionally stored as relative location data (e.g., including an estimated distance and/or an estimated direction) from a center point of the training image and/or the training image region, mathematically represented as $o(F^i_t)$.

Optionally, the extracted training descriptor is further stored with:

Scale of the pyramid level from which the training descriptor $F^i_t$ is extracted, mathematically represented as $s(F^i_t)$.

The training descriptors may be annotated with metadata of the camera pose, relative position, and optionally the scale. Other suitable data structures may be used, for example, a database.

The extracted training descriptors are indexed based on a data structure designed for performing an efficient search that matches an extracted query descriptor with one or more of the extracted training descriptors, optionally a sub-linear search data structure, for example, kd-trees, and/or locality sensitive hashing (LSH). The sub-linear nature of the search provides a running time that is not significantly affected by the increase in the number of indexed training descriptors. Sampling training descriptors at multiple scales (i.e., multiple pyramid level) does not significantly increase the search time.

At 104, a digital image (sometimes referred to herein as a query image) is received by computing device 204. The digital image is mathematically represented as $I_q$. The digital image is a 2D image. The digital image may be a 2D slice from a 3D image. The digital image may be a black and white image (i.e., grayscale), and/or a color image (e.g., based on red, green, blue, or other methods). Color images may be converted into black and white images, and/or black and white based query descriptors may be extracted from the images. The digital image may be a captured still image, or a frame from a video.

The digital image may include multiple objects, and/or a single object. For example, the digital image may include one or more shelves each storing one or more instances of one or more retail items, for example, one or more boxes of a certain brand of tooth paste, one or more boxes of a certain breakfast cereal, and one or more cans of a certain brand of sliced olives. In another example, the digital image includes an outdoor (or indoor) scene, for example, a house located on a street, with a mountain in the background.

Computing device 204 may receive the image, for example, from: camera 208, client terminal(s) 212, storage device 222, and/or server 220.

Digital image is optionally stored in storage device 206 and/or data repository 216 for processing by processor(s) 202 of computing device 204, as described herein.

At 106, query descriptors are extracted from multiple locations in the query image. The method of extraction of the query descriptors is based on the method of extraction of the training descriptors from the training images, so that the query descriptors may be matched to training descriptors.

The query descriptors are extracted from the query image according to a sampling pattern. The sampling pattern may be uniform, for example, based on adjacent boxes having a uniform size, for example, a base step based on a predefined number of pixels, for example, 6 pixels, 10 pixels, 20 pixels, or other values. The sampling pattern may be based on a predefined pattern, for example, a grid of 20×20 patches, a grid of 15×15 patches, or other values. The sampling pattern may be random.

Optionally, the query descriptors are extracted from the query image in a sampling pattern that is sparser than the sampling pattern used to extract training descriptors from the training images.

Each extracted query descriptors is mathematically represented herein as $\{F^j_q\}$.

At 108, one or more training descriptors are identified for each query descriptor. Each one of the query descriptors is compared with multiple training descriptors for identifying matching training descriptors.

Optionally, the matching training descriptors are identified by performing a nearest neighbor search based on the data structure storing the training descriptors.

An exemplary nearest neighbor computation to identify the matching training descriptors is now described. The method identifies the K approximate nearest neighbors of each extracted query descriptor $F^j_q$ in the stored indexed training descriptors.

The exemplary nearest neighbor computation described herein is computationally more efficient than other search methods, in terms of computational processing time and/or computational resources (e.g., processor(s)) for performing the search. For example, searching based on a kdtree (e.g., as described with reference to M. Muja and D. G. Lowe. *Scalable nearest neighbor algorithms for high dimensional data. Pattern Analysis and Machine Intelligence, IEEE Transactions on,* 36, 2014) takes over 20 seconds on a modern PC, which is impractical.

The exemplary nearest neighbor computation uses the spectral hashing (e.g., as described with reference to Weiss et al.) based LSH method to identify statistically significant matching training descriptors according to a matching requirement, optionally the Euclidean nearest neighbors based on a Euclidean distance requirement, for example, ≤0.5 distance in L2-normalized descriptor space. The statistically significant matching training descriptors are identified for a subset of the extracted query descriptors, for example, for about 10%, about 20%, or about 30% of the total extracted query descriptors. The other extracted query descriptors remain unmatched (temporarily, as described below).

The exemplary nearest neighbor computation is based on the assumption that each of the query-regions in the query image has at least one matching training descriptor and/or at least one matching training image region.

An extracted query descriptor $F^j_q$ at a location vector (i.e., estimated distance and estimated direction from the center point) of the associated region of the query image, mathematically represented herein as $z(F^j_q)$, is matched to a training descriptor mathematically represented as $N^j_k$. For every unmatched nearby (e.g., according to a distance requirement, optionally the Euclidean distance requirement) extracted query descriptor, mathematically represented herein as $F^m_q$, a matching training descriptor, mathematically represented herein as $N^m_k$ is computed such that the difference between the center point of the identified matching training descriptor and the computed training descriptor matched to the unmatched query descriptor is equal to the difference between the location vector of the query descriptor matched to the identified matching training descriptor and the location vector of the unmatched query descriptor for which the matching training descriptor is computed, mathematically represented as: $o(N^j_k)-o(N^m_k)=z(F^j_k)-z(F^m_k)$, where:

$N^j_k$ denotes a training descriptor matched to query descriptor $F^j_k$ $N^m_k$ denotes the computed training descriptor matched to unmatched query descriptor $F^j_k$ denotes the query descriptor matched to training descriptor $F^j_k$ $F^m_k$ denotes the unmatched query descriptor for which the matching training descriptor $N^m_k$ is computed Optionally, an unmatched query descriptor $F^m_q$ is paired with a single already matched query descriptor $F^j_q$ that is closest to the unmatched query descriptor $F^m_q$. The distance between the unmatched query descriptor and the paired already matched query descriptor may be determined based on pixel coordinates of the query image (e.g., according to the distance transform). Paired of unmatched query descriptors and already paired query descriptors not meeting the matching requirement discussed above are excluded. The pairing with the single already matched query descriptor reduces computations, improving computational performance of the computing device.

The match extension process is iterated. The process may be randomized by independently ignoring each previously matched query descriptor with a defined probability p, for example, p=0.5 or other values. The randomization provides that for any unmatched query descriptor, the probability of extending the match from the $n^{th}$ closest already matched query descriptor is equal to $(1-p)p^{n-1}$. The matching is extended from multiple nearby query descriptors rather than just from the spatially closest query descriptor.

At 110, query-regions of the query image are computed. The query regions of the query image are selected according to a correlation with corresponding regions of training image(s). The query regions relate to the training image region(s) by 2D translation and/or 2D scaling. Even through the query image may be taken with a new camera pose that does not directly correspond to any of the camera poses associated with the training images, local regions of the query image (i.e., the identified query-regions) correspond to training images by 2D translation and/or 2D scaling.

Each query-region is associated with a center point and a computed weighted mask that weights the query-region pixels according to computed correlations with the corresponding training image regions. The weighted mask may be computed based on a computed correlation indicative of similarity of the query descriptors extracted from the query image region and the training descriptors extracted from the corresponding training image region. The weighted mask is computed with respect to the computed 2D scale and/or 2D shift transformation between the query-region and the matched training image region. The computed weighted mask may be contiguous or a group of connected components that includes the query-region.

Each query-region of the digital image and mapped training image region(s) are one or more of: arbitrary size, arbitrary shape, arbitrary location, and arbitrary scale. Size, shape, location, and/or scale is automatically computed (e.g., by code instruction executed by one or more processors). It is noted that the arbitrary size, arbitrary shape, arbitrary location, and arbitrary scale is in contract to a prescribed size, shape, location and/or scale based on fixed parameters, for example, which form a basis for other methods. The relationship between the query image and the training images may be one to one.

The query-regions may be contiguous or non-contiguous.

Each query-region is associated with a cluster of query descriptors. The members of each cluster of query descriptors are located within the query-region, and/or in near proximity to the query-region and/or the center points of the relative location data of the training descriptors matching the members of the cluster of query descriptors are located within the query-region and/or are located in proximity to the center point of the query-region. Each query-region is associated with a center point.

Optionally, a center point of the query-region is computed without necessarily computing the size and/or borders of query-region itself. The members of the cluster of query descriptors are selected relative to the center point of the query-region. The center point of the query-region is estimated to correspond to the center point of one of the training image regions.

Optionally, the query-regions are computed based on a computed aggregated relative location data for each query descriptor based on the relative location data associated with the matching training descriptor. The computed aggregated relative location data for each query descriptor represents an averaged contribution of each of the identified nearest neighbor training descriptors (e.g., the K nearest neighbors).

Each query-region may be computed based on the following exemplary method: The relative location data of the matching training descriptors is aggregated to generate a Kernel Density Estimate (KDE) for posterior probability maps of the center point and scale of each respective query-region. The posterior probability maps are aggregated into probability map clusters. Each probability map cluster may be represented as an x-y-s-3D-heatmap having a center point at a location with coordinates defined by an x-axis (x) and a y-axis (y) and defined by a scale (s). Each of the query-regions is extracted according to the probably map clusters, based on inter-scale normalization and non-maximal suppression according to location of the center point and the scale of each respective probability map cluster. Each query-region is defined according to the center point and scale of the query-region associated with the respective probability map cluster and according a subset of query image descriptors that contribute weights to the respective probability map cluster. The subset of query image descriptors is converted to a probability map by accumulating the respective weight contributions (to the probability map cluster) to the locations from which the query image descriptors belonging to the subset were sampled.

The systems and/or methods described herein compute the query-regions independently of the camera pose associated with each of the query-regions.

In terms of mathematical representation, U denotes a triplet of random variables U=<X, S, C> representing a random event of appearance of a training image region C at image location X (query-region center coordinate) and scale S (scale relative to the nominal size of the query-region, X and S may jointly define the query-region. It is noted that S is optional, such as when training descriptors are extracted from different levels of a Gaussian pyramid of the training image. The image location may be defined according to the relative location data that includes an estimated distance and an estimated direction from the center point.

The posterior probability $P(U|F^j_q)$ is computed and/or approximated for all the possible assignments to U, where $F^j_q$ denotes a certain extracted query descriptor. The top scoring hypotheses U are selected and used for computed probabilities, for example, by a Non-Maximal Suppression (NMS) process based on overlaps between the query-regions. Based on an assumption of a uniform prior over U, and that the posterior probability decomposes using the Native-Bayes method, the following mathematical relations may be used:

$$P(U \mid \{F^j_q\}) \propto P(\{F^j_q\} \mid U) = \prod_j P(F^j_q \mid U)$$

It is assumed that each training image region occupies a small portion of the query image, and therefore that most of the query descriptors $\{F^j_q\}$ are not generated by a certain assignment to U that represents a hypothesis that a certain training image region is present at a certain image query-region. Such query descriptors are either associated with the background of the image or with other query-regions of the image. In terms of mathematical representation:

$P(F^j_q|U) = \Sigma_{R^j} P(R^j) \cdot P(F^j_q|U, R^j)$ where $R^j$ denotes an unobserved binary random variable, $R^j=1$ denotes the event that $F^j_q$ is indeed related to the hypothesis U.

The distributions $Q(F^j_q)$, $Q(F^j_q, X, S)$, and $Q(F^j_q, X, S, C)$ are computed for every query descriptor $F^j_q$ extracted from query image $I_q$, and are defined below with reference to Equations (4)-(6). $P(F_q^j|U, R^j)=Q(F_q^j|U)$ when $R^j=1$ and $P(F_q^j|U, R^j)=Q(F_q^j)$ when $R^j=0$, which provides: $P(R^j=0) \gg P(R^j=1)$, and the following relationship holds:

$$\text{Log}P(U | \{F_q^j\}) = \text{const} + \sum_j \text{Log}P(F_q^j | U) \approx \sum_j \frac{Q(F_q^j | U)}{Q(F_q^j)} \propto \sum_j \frac{Q(F_q^j, U)}{Q(F_q^j)}.$$

At 112, for each query-region, a group of training image regions is selected as candidates for the respective query-region.

Query descriptors having common center points defined by the matching training descriptors are clustered. The members of each cluster point towards a common center. The clustering may be performed for each query-region. For example, in an image that includes an image of a pipe with a pressure gauge and a valve, one cluster of training descriptors is associated with a training image of the pressure gauge, based on a common center corresponding to the center of the training image region that includes the pressure gauge. Another cluster of images descriptors is associated with the training image of the valve, based on another common center corresponding to the center of the region of the training image that includes the valve.

The members of the group may be selected according to an analysis of the relative location data associated with each member of the cluster of query descriptors of each query-region. The analysis identifies a group of common center points of the relative location data. Each member of the group of identified common center points is associated with a respective member of the group of training image regions.

The members of the group may be selected according to training image regions associated with the matching training descriptors of the cluster of query descriptors that have the largest number of vectors pointing to a common location, optionally pointing to the center of the query-region (within an error threshold). For example, when 5 query descriptors of the query-region associated with the pressure gauge have vectors (based on the relative location data and training image region of the matching training descriptors) point to the center of the query-region, and 2 query descriptors associated with the valve have vectors pointing to different locations in the query-region (or to the center of the query-region), the training image region that includes the pressure gauge is selected over the training image region that includes the valve, as the probability of the query-region including the image of the pressure gauge is higher than the probability of the query-region including the image of the valve. When selecting the region of the training image that includes the pressure gauge over the region of the training image that includes the valve, the matching training descriptors that point to the common query image location within the error threshold (i.e., share the common region hypothesis) are considered. Training descriptors that point to other image locations are excluded under the assumption as association with a different region hypothesis.

The members of the group may be selected according to a requirement of a computed probability of the query-region mapping to each of the training image regions associated with the matching training descriptors of the cluster of query descriptors associated with the query-region. For example, the top 3 or 5 candidate training image regions.

The computed probability of the query-region being each one of the training image regions associated with each identified matching training descriptor(s) of each member of the cluster of query descriptors associated with the respective query-region is computed. The probability is computed based on the probability of observing each member of the cluster of query descriptors associated with each respective training image region of the matching descriptor(s) located relative to the center point of the respective query-region according to the relative location data defined by the matching training descriptor.

As mathematically represented below with equations, the probability of the respective query-region being one of the training image regions is computed based on one or more of the following components: a data fidelity value that penalizes distance between the query descriptor and the matching training descriptor(s), a penalty for deviation in expected spatial location between the center of the hypothesis-region of the query-region and the center of the training image region associated with the matching training descriptor(s), and discrepancy in scale between the query-region and the training image region associated with the matching training descriptor(s).

To identify the most likely hypothesis U by computing $\text{argmax}_U \log P(U|F_q^j)$ $\text{argmax}_U \log(U|F_q^j)$, the following exemplary method is described for handling the large size of the proposal set for U=<X, S, C>, based on the assumption of a large number of training images and/or training image regions. The exemplary method is based on a sequential approximate inference, where each time a part of the variables is inferred and conditions the inferred variables to infer the remaining variables. The following three steps of the inference method are mathematically represented as:

inference step (1)

$$\hat{X}, \hat{S} \leftarrow \text{argmax}_{X,S} \sum_j \frac{Q(F_q^j, X, S)}{Q(F_q^j)}$$

$$\left(\text{here } Q(F_q^j, X, S) = \sum_C Q(F_q^j, X, S, C)\right),$$

inference step (2)

$$\hat{C} \leftarrow \text{argmax}_C P(C | \{F_q^j\}, \hat{X}, \hat{S}) = \text{argmax}_C \sum_j \frac{Q(F_q^j, \hat{X}, \hat{S}, C)}{Q(F_q^j)},$$

inference step (3)

$$\hat{X}, \hat{S} \leftarrow \text{argmax}_{X,S} P(X, S | \{F_q^j\}, \hat{C}) == \text{argmax}_{X,S} \sum_j \frac{Q(F_q^j, X, S, \hat{C})}{Q(F_q^j)}.$$

The distributions $Q(F_q^j)$, $Q(F_q^j, X, S)$, and $Q(F_q^j, X, S, C)$ are computed for every query descriptor $F_q^j$ extracted from query image $I_q$, and used as input for the relevant inference steps (1-3).

Each of the inference steps (1-3) returns multiple hypotheses to be processed by the subsequent step, where the final output of step (1) is the input to the NMS process. The equation of step (1) denotes an objectness step that infers the potential locations (e.g., relative location data) and optional scales of the query-regions identified for the query image $I_q$. As discussed herein, the equation of step (2) denotes generation of the short list of potential candidate training image region for each query-region returned by the objectness step (1). The equation of step (3) denotes a detection refinement step, in which the location and optionally the scale is refined for each candidate training image region returned by step (2), and the final score is computed for the candidate training image region.

As described with reference to act 108 of FIG. 1, a set of K nearest neighbors of $F_q^j$ in the set of training descriptors are identified. The set of K nearest neighbors are optionally the Euclidean nearest neighbors, mathematically represented as $\{N_k^j | 1 \leq k \leq K\}$. The set of training descriptors extracted from the training images is mathematically represented as $\{F_t^i | \forall i, t\}$. From the set of nearest neighbors, $Q(F_q^j, X, S)$ is computed, using approximate Kernel Density Estimate, mathematically represented as:

$$Q(F_q^j, X, S) \approx Q(S) \cdot \frac{1}{K} \sum_{k=1}^{K} \phi(F_q^j, N_k^j, X, S), \quad \text{equation (4)}$$

where $$\phi(F_q^j, N_k^j, X, S) = \exp\left(-\frac{1}{2} \|F_q^j - N_k^j\|^2 / \sigma^2\right) \cdot \quad \text{equation (5)}$$
$$\cdots \cdot \exp\left(-\frac{1}{2} S^2 \|X - |z(F_q^j) + o(N_k^j)|\|^2 / \rho^2\right) \cdot$$
$$\cdots \cdot \exp\left(-\frac{1}{2}(S - s(N_k^j))^2 / \gamma^2\right)$$

The value for $Q(F_q^j, X, S)$ is an averaged contribution of the K nearest neighbors. The probability of observing query descriptor $F_q^j$ at location X, optionally with scale S, conditioned on the certain neighbor training descriptor $N_k^j$ may be modeled as a product of three components in the equation above.

The first component $\exp(-\frac{1}{2}\|F_q^j - N_k^j\|^2/\sigma^2)$ denotes the data fidelity term, penalizing distance between the visual descriptor $F_q^j$ and the certain neighbor training descriptor $N_k^j$. $\sigma$ denotes a defined tolerance to variation of the expected query descriptor appearance.

The second component $\exp(-\frac{1}{2}S^2\|X-|z(F_q^j)+o(N_k^j)|\|^2/\rho^2)$ denotes the penalty for deviation in expected spatial location, where $z(F_q^j)$ denotes the image location of $F_q^j$ in query image $I_q$ and $o(N_k^j)$ denotes the vector between training descriptor $N_k^j$ and the center of the query-region. $\rho$ denotes a defined tolerance to the expected local query-region deformation.

The third component $\exp(-\frac{1}{2}(S-s(N_k^j))^2/\gamma^2)$ denotes the discrepancy in scale. $\gamma$ denotes a defined tolerance to local scale variation.

Exemplary tolerance values (used in the experiments described below) include: $\sigma=0.2$, $\rho=15$, and $\gamma=0.1$. The tolerance values were set on a small validation set not used in the experiments.

The term $\phi(F_q^j, N_k^j, X, S)$ denotes the belief (e.g., probability) that a certain query descriptor $F_q^j$ extracted from a certain query-region (from any query-region) appears at location X, optionally with scale S, based on the matching training descriptor $N_k^j$.

To balance the different scales being represented by a different number of training descriptors, set $Q(\check{S}) \propto 1/s^2$. Marginalizing over X and S leaves the fidelity term alone:

$$Q(F_q^j) \approx \frac{1}{K} \sum_{k=1}^{K} \exp\left(-\frac{1}{2}\|F_q^j - N_k^j\|^2/\sigma^2\right) \quad \text{equation (6)}$$

To improve the computation efficiency of computing the equation of inference step (1) efficiency with $Q(F_q^j, X, S)$ as defined by equation (4) for each scale S, a weighted histogram of the size of the query image $I_q$, where each pixel $z(F_q^j)+o(N_k^j)$ accumulates weight mathematically represented as $$\frac{\exp\left(-\frac{1}{2}\|F_q^j - N_k^j\|^2/\sigma^2\right)}{S^2 Q(F_q^j)},$$

and then a convolution is performed with a 2D symmetric Gaussian kernel with STD $\rho/S$. The average across nearby scales using a 1D Gaussian kernel with STD $\gamma$ is computed. The following mathematical relationship is set: $Q(F_q^j, X, S, C) \propto \Sigma_k \mathrm{id}(l(N_k^j)=C) \cdot \phi(F_q^j, N_k^j, X, S)$ where id( ) denotes the indicator function.

The equation in inference step (2) may be computed by maximizing over a weighted histogram accumulating to cells indexed by $l(N_k^j)$ with weights denoted by $\Phi(F_q^j, N_k^j, \hat{X}, \hat{S})Q(F_q^j)$.

The equation in inference step (3) is computed as the equation in inference step (1), with filtering out of the weights for which $l(^+N_k^j) \neq {}^+\hat{C}$.

At 114, a back projection data structure is computed. The back projection data structure, optionally implemented as a matrix (denoted BP) is computed for each detection hypothesis (i.e., the query-region) of training image denoted $\hat{C}$ detected at query image location $\hat{X}$ with optional scale $\hat{S}$. The size (e.g., dimensions) of the back projection data structure (optionally matrix BP) is created having a size (e.g., dimensions) corresponding to the size of the query image (e.g., same or similar dimensions).

Weights are assigned to locations from which the query descriptor was sampled.

The assigned weights are denoted as: $\max_k[\mathrm{id}(l(N_k^j)=\hat{C}) \cdot \phi(F_q^j, N_k^j, \hat{X}, \hat{S})]$.

The locations are denoted as $z(F_q^j)$. The sampled query descriptor is denoted as $F_j^q$.

The assigned weights represent the probability (e.g., maximal belief) that the nearest neighbors (denoted $\{N_k^j\}$) of sampled query descriptor $F_q^j$ contribute to the detection hypothesis $\hat{C}$, $\hat{X}$, and optionally $\hat{S}$.

Based on the detected center location $\hat{X}$, and optionally $\hat{S}$, one or more cloud points (each denoted P) visible in training image $\hat{C}$ are mapped to corresponding query image pixels (each denoted p).

Each matched and/or mapped pixel pair (denoted $\{P, p\}$) is weighted by the data structure (denoted BP(p), the value of the data structure optionally matrix BP as pixel p).

A set of the weighted pixel correspondences (denoted $\{P, p, BP(p)\}$) collected from the detected hypotheses denotes a set of weighted matches.

Figure 4:
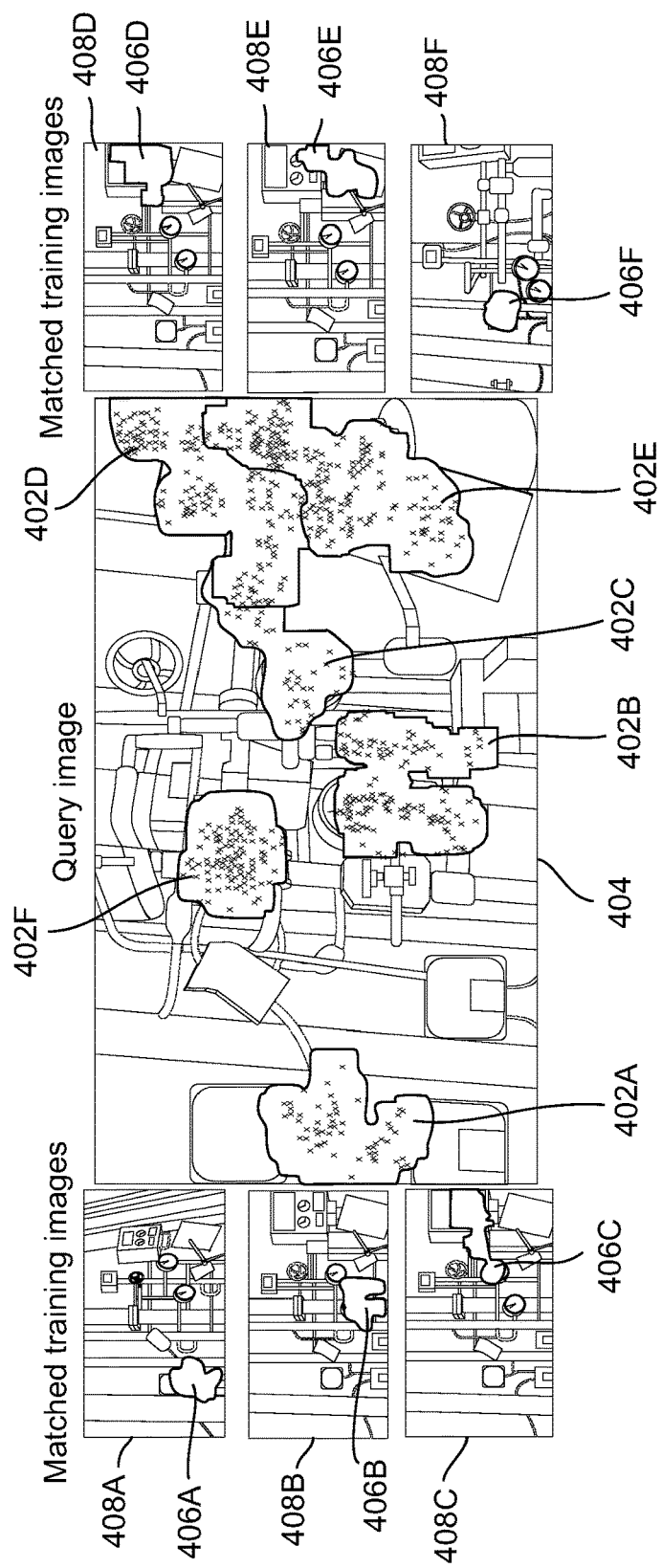
FIG. 4 is an example of regions of training images matched to a query image, in accordance with some embodiments of the present invention.

Reference is now made to FIG. 4, which depicts an example of regions of training images matched to a query image, in accordance with some embodiments of the present invention. Pixels (shown as X) in query-region 402A of query image 404 are mapped to point clouds of training region 406A of training image 408A. Pixels in query-region 402B of query image 404 are mapped to point clouds of training region 406B of training image 408B. Pixels in query-region 402C of query image 404 are mapped to point clouds of training region 406C of training image 408C. Pixels in query-region 402D of query image 404 are mapped to point clouds of training region 406D of training image 408D. Pixels in query-region 402E of query image 404 are mapped to point clouds of training region 406E of training image 408E. Pixels in query-region 402F of query image 404 are mapped to point clouds of training region 406F of training image 408F.

Figure 5:
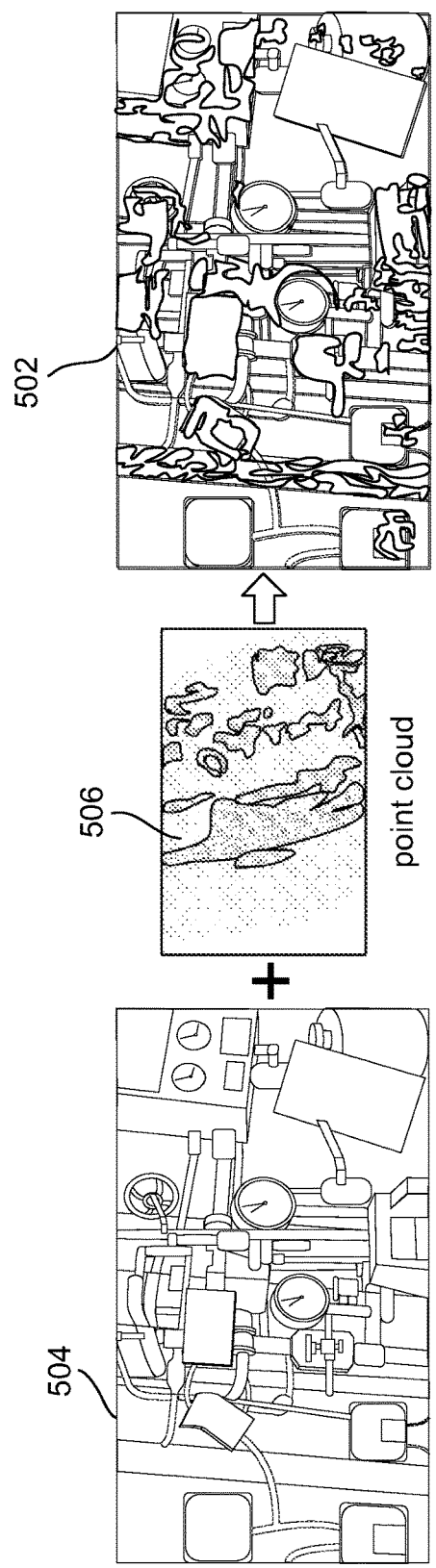
FIG. 5 depicts a resulting correspondence between pixels of a query image and a point cloud model (PCM), in accordance with some embodiments of the present invention.

Reference is now made to FIG. 5, which depicts the resulting correspondence 502 between pixels of a query image 504 and a PCM 506, in accordance with some embodiments of the present invention. The camera pose is computed with respect to the computed correspondence 502.

Referring now back to FIG. 1, at 116, the camera pose of the query image is computed. The camera pose for the query image is computed by aggregating camera poses associated with training images having regions that are matched to query-regions of the query image, and according to an aggregation of cloud points mapped to corresponding pixels of the matched query-regions. The camera pose is computed from the camera poses associated with members of the set of weighted pixel matches {P, p, BP(p)}. The camera pose of the query image may be computed as an aggregation, optionally a weighted aggregation of the camera poses associated with members of the set of weighted pixel matches {P, p, BP(p)}, for example, according to an iteratively reweighted least squares (IRLS) based approach, for example, as described with reference to P. W. Holland and R. E. Welsch. *Robust regression using iteratively reweighted least-squares. Communications in Statistics—Theory and Methods,* 6(9):813-827, 1977.

The computed camera pose includes a computed rotation matrix (R) and/or a computed translation vector (T). R and/or T are computed for known calibration matrix (K) defined for the camera that captured the query image, for example, calibration matrix (K) is stored in a database, downloaded from a web server of the manufacturer of the camera, and/or obtained from a storage device on the camera. R and/or T are computed according to the PCM coordinate system. It is noted that R and/or T are computed for a single query image of the scene, captured at a different time and/or different camera pose and/or different camera than the camera that captured the training images.

At 118, the computed camera pose of the query image is provided. Optionally, the image is adapted to present the camera pose, for example, using a tag, color code, or other method. Optionally, the image is adapted to present each query-region, for example, the query-regions are marked on the image. Alternatively or additionally, metadata and/or another report format is generated indicative of the identified camera pose. The metadata may be provided to another computing device for further processing, for example, provided in real time to an AR headset.

Figure 3:
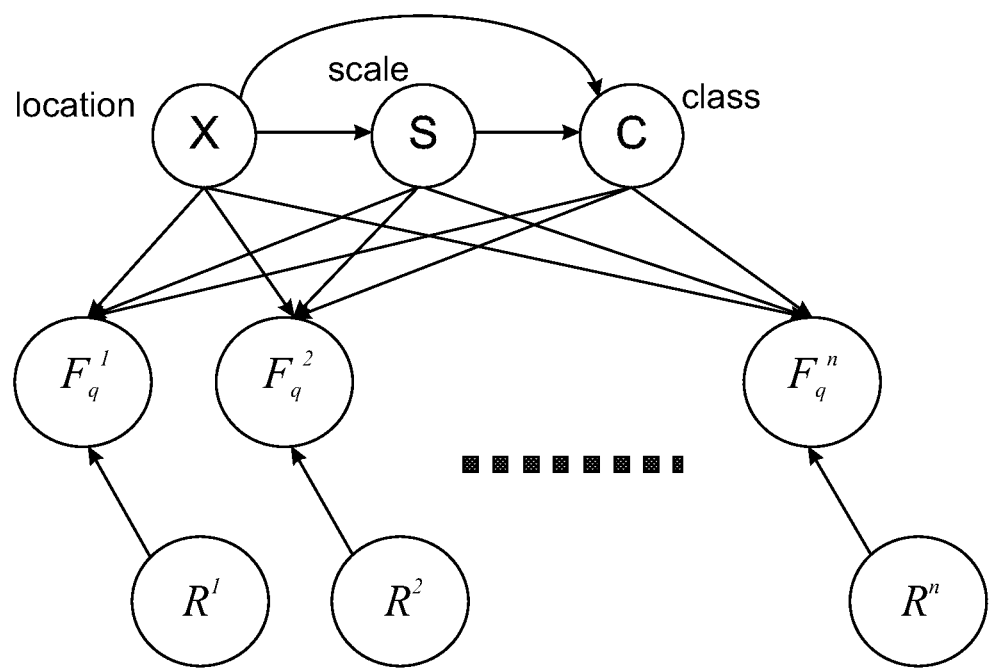
FIG. 3 is a is a schematic of a probabilistic model used to identify a training image region to assign to a query-region, in accordance with some embodiments of the present invention.

Reference is now made to FIG. 3, which is a schematic of a probabilistic model used to identify a training image region to assign to a query-region, in accordance with some embodiments of the present invention. $R^1$, $R^2$, $R^n$ denote binary random variables used to randomly disconnect descriptions from the hypothesis U. One binary random variable is associated with each query descriptor $F^1_q$, $F^2_q$, ..., $F^n_q$, $R^i=0$ denotes $F^i_q$ is generated independently from the hypothesis U. As discussed herein, Each query descriptor $F^i_q$ is associated with a hypothesis U that includes a location X (i.e., relative location data relative to a center point of a certain training image region), a scale S, and a class C (i.e., training image region), which are associated with the one or more training descriptors matched to each query descriptor.

Various embodiments and aspects of the systems and/or methods described herein and as claimed in the claims section below find experimental support in the following examples.

EXAMPLES

Reference is now made to the following examples, which together with the above descriptions illustrate some implementations of the systems described herein, in a not necessarily limiting fashion.

A Point Clouds Pose Estimation (PCPE) dataset was collected by the inventors, and used to evaluate computations performance of a computing device executing code instructions according to the systems and/or methods described herein.

For the PCPE dataset, somewhat more optimized C++ code runs at 0.2 seconds per frame.

The PCPE dataset includes five videos of three large scenes and two objects which were reconstructed into point clouds using the Visual SFM. The point cloud was constructed using 100 frames sampled from a single training movie per scene. For each point cloud an additional test movie was captured at a different time and using a different device. In addition, the objects were moved and were tested in different lighting and environment. The task was to detect the presence of the point cloud in each individual frame of the test videos and to accurately detect the camera pose with respect to the point cloud. FIG. 5 depicts an example result. The camera pose is considered to be detected correctly when the average point cloud re-projection error is below 5% of image height.

The systems, methods, and/or code instructions described herein successfully detected the camera pose in 93.5% of the video frames (averages over all the test videos).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant images will be developed and the scope of the term image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of computing a camera pose of a digital image, the method comprising:
   receiving a digital image;
   computing a plurality of query-regions of the digital image by mapping each query-region of the digital image to at least one training image region of at least one training image of a plurality of training images, by at least one of a two dimensional (2D) translation and a 2D scaling operation, to identify a subset of said plurality of training images wherein each training image of said subset having at least one region mapped to a corresponding region in said digital image, each training image associated with one of a plurality of different reference camera poses;
   computing a weight mask by a correlation indicative of similarity between query descriptors extracted from the query-region and training descriptors extracted from the corresponding training image region, with respect to the at least one of the 2D translation and 2D scaling operation, wherein each query-region is associated with a center point and said weight mask and wherein said association between said each training image and a respective one of said plurality of different reference camera poses is recorded as at least one of a tag, metadata and database mapping;
   mapping cloud points corresponding to pixels of each matched training image region to corresponding images pixels of the computed plurality of matched query-regions of the digital image according to a statistically significant correlation requirement between the common center point of the respective matched query-region and the center point of the respective matched training image region, and according to the computed weight mask; and
   computing the camera pose of the digital image by aggregating weighted camera poses of the different camera poses associated with the subset of training images matched to query-regions and based on said weight mask, according to the mapped cloud points and corresponding image pixels of the computed plurality of matched query-regions.

2. The method of claim 1, wherein each query-region of the digital image and mapped at least one training image region are of arbitrary size, arbitrary shape, arbitrary location and arbitrary scale, and are automatically determined.

3. The method of claim 1, wherein the weight mask defines the shape, location, and scale of the respective detected query-region.

4. The method of claim 1, wherein at least some of the training image regions overlap.

5. The method of claim 1, wherein the weight mask is contiguous or a group of connected components that include the query-region.

6. The method according to claim 1, further comprising:
   extracting a plurality of query descriptors from a respective plurality of locations in the digital image;
   comparing each one of the plurality of query descriptors with a plurality of training descriptors for identifying a plurality of matching training descriptors, each one of the plurality of training descriptors is associated with one of a plurality of different reference camera poses, and with relative location data from a center point of the training image region of the training image of the plurality of training images; and
   computing the plurality of query-regions of the digital image by clustering the query descriptors having common center points defined by the matching training descriptors.

7. The method according to claim 6, further comprising:
   computing weights of the mapped cloud points and corresponding image pixels of the computed plurality of query-regions of the digital image,
   wherein the weights denote the probability that the nearest neighbors of each respective sampled query descriptor contributes to the associated training image region, wherein the camera pose is computed according to the computed weights.

8. The method according to claim 7, further comprising computing a back projection data structure for each the plurality of query-regions of the digital image, wherein the dimensions of the back projection data structure correspond to the dimensions of the query image, wherein the back projection data structure stores the computed weights according to the plurality of locations of the digital image from which the plurality of query descriptors are extracted, wherein for each of the mapped cloud points and corresponding image pixels of the computed plurality of query-regions, the respective pixel of the digital image is weighted by the value of the back-projection data structure defined for the respective pixel.

9. The method according to claim 1, wherein the camera pose of the digital image is computed according to an iteratively reweighted least squares (IRLS) based approach.

10. The method according to claim 1, wherein the camera pose of the digital image is computed according to a three dimensional (3D) point cloud model (PCM) of at least a portion of a scene captured within the digital image.

11. The method of claim 10, wherein the PCM is computed from a sequence of 2D images according to a structure-from-motion (SFM) based method.

12. The method of claim 1, wherein the determined camera pose is a new camera pose that does not necessarily match to the camera poses of the training images.

13. The method of claim 1, wherein the plurality of query-regions of the digital image and the mapped at least one training image region are of arbitrary location, arbitrary scale, and arbitrary shape.

14. The method of claim 6, wherein the plurality of training descriptors are extracted from a training set comprising a single training sample image associated with a unique camera pose of at least a portion of a scene captured in the digital image.

15. The method of claim 6, wherein each query-region is further associated with a scale relative to a reference size, and wherein each query-region of the plurality of query-regions is computed by:

aggregating the relative location data of the matching training descriptors to generate a Kernel Density Estimate (KDE) for a plurality of posterior probability maps of the center point and scale of each respective training image region of a training image;

aggregating the posterior probability maps into a plurality of probability map clusters;

extracting each of the plurality of query-regions with inter-scale normalization and non-maximal suppression according to location of the center point and the scale of each respective cluster of the plurality of probability map clusters, wherein each of the plurality of query-regions is defined according to the center point and scale of the training image associated with the respective cluster of the plurality of probability map clusters and according to a subset of query image descriptors that contribute weights to the respective probability map cluster, the subset of descriptors is converted to a probability map by accumulating respective weight contributions to the probability map cluster to the locations from which the subset of query image descriptors were sampled.

16. The method of claim 6, wherein the plurality of training descriptors are indexed with a sub-linear search data structure, and the comparing is performed by searching for the matching training descriptor of the extracted query descriptor within the sub-linear search data structure.

17. The method of claim 6, wherein the comparing is performed by finding a set of Euclidean nearest neighbors of the respective extracted query descriptor, wherein each member of the set of Euclidean nearest neighbors is a certain matching training descriptor.

18. A system for computing a camera pose of a digital image, the system comprising:

a non-transitory memory having stored thereon a code for execution by at least one hardware processor of a computing device, the code comprising:

code for receiving a digital image;

code for computing a plurality of query-regions of the digital image by mapping each query-region of the digital image to at least one training image region of at least one training image of a plurality of training images by at least one of a two dimensional (2D) translation and a 2D scaling operation to identify a subset of said plurality of training images wherein each training image of said subset having at least one region mapped to a corresponding region in said digital image, each training image associated with one of a plurality of different reference camera poses code for computing a weight mask by a correlation indicative of similarity between query descriptors extracted from the query-region and training descriptors extracted from the corresponding training image region, with respect to the at least one of the 2D translation and 2D scaling operation, wherein each query-region is associated with a center point and said weight mask and wherein said association between said each training image and a respective one of said plurality of different reference camera poses is recorded as at least one of a tag, metadata and database mapping;

code for mapping cloud points corresponding to pixels of each matched at least one training image region to corresponding images pixels of the computed plurality of matched query-regions of the digital image according to a statistically significant correlation requirement between the common center point of the respective matched query-region and the center point of the respective matched training image region, and according to the computed weight mask; and code for computing the camera pose of the digital image by aggregating weighted camera poses of the different camera poses associated with the subset of training images matched to query-regions and based on said weight mask, according to the mapped cloud points and corresponding image pixels of the computed plurality of matched query-regions.

19. A computer program product for computing a camera pose of a digital image, the computer program product comprising:

a non-transitory memory having stored thereon a code for execution by at least one hardware processor of a computing device, the code comprising:

instructions for receiving a digital image;

instructions for computing a plurality of query-regions of the digital image by mapping each query-region of the digital image to at least one training image region of at least one training image of a plurality of training images by at least one of a two dimensional (2D) translation and a 2D scaling operation to identify a subset of said plurality of training images wherein each training image of said subset having at least one region mapped to a corresponding region in said digital image, each training image associated with one of a plurality of different reference camera poses;

instructions for computing a weight mask by a correlation indicative of similarity between query descriptors extracted from the query-region and training descriptors extracted from the corresponding training image region, with respect to the at least one of the 2D translation and 2D scaling operation, wherein each query-region is associated with a center point and said weight mask and wherein said association between said each training image and a respective one of said plurality of different reference camera poses is recorded as at least one of a tag, metadata and database mapping;

instructions for mapping cloud points corresponding to pixels of each matched at least one training image region to corresponding images pixels of the computed plurality of matched query-regions of the digital image according to a statistically significant correlation requirement between the common center point of the respective matched query-region and the center point of the respective matched training image region; and instructions for computing the camera pose of the digital image by aggregating weighted camera poses of the different camera poses associated with the subset of training images matched to query-regions and based on said weight mask, according to the mapped cloud points and corresponding image pixels of the computed plurality of matched query-regions.

\* \* \* \* \*